United States Patent
Camp et al.

(10) Patent No.: US 7,097,205 B2
(45) Date of Patent: Aug. 29, 2006

(54) VEHICLE STEERING ASSEMBLY

(75) Inventors: Eckart Op Den Camp, Koblenz (DE); Jiri Nevrkla, Dacice (CZ); Michael Appleyard, Solihull (GB); Petr Bachel, Dacice (CZ); Josef Pivny, Police (CZ); Petr Navratil, Dacice (CZ)

(73) Assignees: TRW Lucas Varity Electric Steering Limited, (GB); Lucas Automotive Gmbh, (DE); TRW DAS A.S., (CZ)

( * ) Notice: Subject to any disclaimer, the term of this patent is extended or adjusted under 35 U.S.C. 154(b) by 0 days.

(21) Appl. No.: 10/831,650

(22) Filed: Apr. 23, 2004

(65) Prior Publication Data
US 2005/0035584 A1 Feb. 17, 2005

Related U.S. Application Data

(63) Continuation of application No. PCT/GB02/04765, filed on Oct. 23, 2002.

(51) Int. Cl.
B62D 1/18 (2006.01)
B62D 1/184 (2006.01)
B62D 1/19 (2006.01)

(52) U.S. Cl. .................. 280/775; 280/777; 74/493
(58) Field of Classification Search ............. 280/775, 280/777; 74/492, 493
See application file for complete search history.

(56) References Cited

U.S. PATENT DOCUMENTS

| | | | |
|---|---|---|---|
| 3,791,233 A | 2/1974 | Bane | |
| 5,009,120 A * | 4/1991 | Iseler et al. ................ | 74/493 |
| 5,029,489 A * | 7/1991 | Burmeister et al. .......... | 74/493 |
| 5,074,586 A | 12/1991 | Baskett | |
| 5,524,927 A * | 6/1996 | Toussaint ................ | 280/777 |
| 5,537,890 A * | 7/1996 | Thomas .................. | 74/493 |
| 5,562,307 A * | 10/1996 | Connor .................. | 280/777 |
| 5,988,679 A * | 11/1999 | Schelling et al. ........... | 280/775 |
| 6,036,228 A * | 3/2000 | Olgren et al. .............. | 280/775 |
| 6,581,965 B1 * | 6/2003 | Lutz ...................... | 280/775 |
| 6,799,486 B1 * | 10/2004 | Manwaring et al. ........ | 74/493 |

FOREIGN PATENT DOCUMENTS

EP 0 341 078 11/1989

(Continued)

*Primary Examiner*—Paul N. Dickson
*Assistant Examiner*—George D Spisich
(74) *Attorney, Agent, or Firm*—MacMillan, Sobanski & Todd, LLC (57) ABSTRACT

An adjustable steering column assembly for a vehicle comprises an upper shroud portion (8) which is adapted to receive a steering column (1, 2), a lower guide portion (7) which is adapted to support the shroud portion (8) and be secured to a mounting bracket (14) fixed relative to the chassis of the vehicle, a connecting pin (13) which projects through an elongate opening provided in the fixed bracket (14), an opening in the lower guide portion (7) and an elongate opening in the upper shroud portion (8), a toothed rail member (19) which is connected to the upper-shroud portion by an energy absorbing device (22), and an operating lever (17) which is operatively connected to the connecting pin (13). The pin (13) carries a toothed member (20) provided on an end of the connecting pin nearest the steering column (1,2) which engages with the toothed rail member when the pin (13) is drawn towards the fixed bracket by operation of the operating lever to a locked position to clamp the toothed rail member, the upper shroud and the guide portion onto the fixed mounting bracket. This permits the assembly to collapse under control of the energy absorbing member (22) in the event of a crash.

14 Claims, 4 Drawing Sheets

FOREIGN PATENT DOCUMENTS

| | | |
|---|---|---|
| EP | 0 440 403 | 8/1991 |
| EP | 0 470 888 | 2/1992 |
| EP | 0 836 981 | 4/1998 |
| FR | 2 809 368 | 11/2001 |
| GB | 2 295 219 | 5/1996 |
| JP | 0 8 295251 | 11/1996 |
| WO | 99/07592 | 2/1999 |
| WO | 03/035450 | 5/2003 |

* cited by examiner

VEHICLE STEERING ASSEMBLY

CROSS REFERENCE TO RELATED APPLICATIONS

This application is a continuation of International Application No. PCT/GB02/04765 filed Oct. 23, 2002, the disclosures of which are incorporated herein by reference, and which claimed priority to Great Britain Patent Application No. 0125417.6 filed Oct. 23, 2001 and Great Britain Patent Application No. 0201979.2 filed Jan. 29, 2002, the disclosures of which are incorporated herein by reference.

BACKGROUND OF THE INVENTION

This invention relates to an improved steering assembly for a road vehicle such as a passenger car. It in particular relates to a steering assembly of the electric power assisted steering (EPAS) type.

EPAS assemblies include an electric motor, which acts through a gearbox and optionally a clutch to apply an assistance torque to a steering shaft of a vehicle. The driver turns the steering shaft by applying a torque to a steering wheel, which is transferred to the steering shaft. The assistance torque applied by the motor acts to help the driver to turn the steering wheel, reducing the effort required for steering the vehicle.

The steering shaft and the motor need accurately to be held in a fixed position relative to one another during normal operation of the vehicle. However, in the event of an accident involving a rapid deceleration of the vehicle it is desirable for the steering assembly to collapse allowing the steering wheel to move towards the front of the vehicle under the weight of the driver. This has in the past been achieved in many ways. In one arrangement the steering shaft is manufactured as a single component with weakenings along its length permitting it to collapse axially by a controlled deformation as a force is applied to the steering wheel. In an alternative, it is known to provide a two-part steering shaft in which one part slides axially over the other as a force is applied to the steering wheel.

As well as allowing the steering shaft to collapse it is essential to permit the shroud, which encloses and supports the shaft to collapse. An example of such an arrangement is taught in our earlier application No. GB 9716747.2 In the assembly described in that application the shroud is provided in two sections with one section sliding into the other. To locate the steering shaft the lower section (furthest from the steering wheel) has two annular bearings, which support the steering shaft at spaced locations.

In some applications, typically on higher specification vehicles, it is also desirable for the steering wheel to be adjustable both for rake and for reach. Reach adjustment requires axial movement of the steering wheel away from or towards the driver. Such a range of adjustment permits the driver to obtain a more comfortable driving position. This further complicates the design of the steering assembly.

In many cases there is often a very limited space within which the collapsible assembly can be located. At least part of this space may be taken up by the electric motor and its housing making the provision of adequate crash protection a more demanding challenge than on a more traditional non-assisted steering system.

A collapsible assembly is known from EP0836981. and corresponding U.S. Pat. No. 5,988,679 which is incorporated by reference herein, in which both rake and reach adjustment can be made from a single lever. In use, a set of teeth on the end of a connecting pin are urged by the lever into engagement with a corresponding set of teeth formed on a shroud of a steering column. In the event of a crash the pin is intended to shear at a weakened section allowing the assembly to collapse. This has the disadvantage that a new pin is required after a collision and the shearing of the pin makes it inherently weak.

SUMMARY OF THE INVENTION

In accordance with a first aspect of the invention we provide an adjustable steering column assembly for a vehicle comprising:

an upper shroud portion which is adapted to receive a steering column;

a lower guide portion which is adapted to support the shroud portion and be secured to a mounting bracket fixed relative to the chassis of the vehicle;

a connecting pin which projects through an elongate opening provided in the fixed bracket, an opening in the lower guide portion and an elongate opening in the upper shroud portion;

a toothed rail member which is connected to the upper shroud portion by an energy absorbing device; and an operating lever which is operatively connected to the connecting pin;

in which the pin carries a toothed member provided on an end of the connecting pin nearest the steering column which engages with the toothed rail member when the pin is drawn towards the fixed bracket by operation of the operating lever to a locked position to clamp the toothed rail member, the upper shroud and the guide portion onto the fixed mounting bracket.

We therefore provide a steering assembly, which permits an axial movement of a steering wheel in an accident by movement of the connecting pin along the elongate opening in the upper shroud member against a force provided by the energy absorbing device.

The upper shroud may include a channel section which accommodates the toothed rail member and the end of the connecting pin. This may be welded to a main body section of the upper shroud which may comprise a hollow tube.

The toothed rail may comprise two rows of teeth, one row extending along each side of the elongate opening in the upper shroud portion. The toothed member carried by the pin may have two corresponding tracks of teeth.

A spring may be provided which biases the toothed member carried by the pin out of engagement with the toothed rail when the lever is moved to an unlocked position. In this position, the teeth do not mesh allowing the upper shroud to slide over the guide rail to an extent permitted by the length of the elongate slot. The spring may, for example, comprise a leaf spring. It may be provided between the toothed member and an inner face of the channel portion of the upper shroud.

The toothed member carried by the pin may comprise a head portion of the pin, or may be a separate portion which is trapped by a head of the pin when the lever is in its locked position.

The opening in the fixed mounting bracket 14 may comprise a substantially vertically inclined elongate slot. One or more tracks of teeth may be provided alongside this slot which also extend vertically and co-operate with teeth on a locking member 16 operatively connected to the connecting pin 13 when the lever is in the locked position.

The locking member 16 may be provided on the opposite side of the mounting bracket 14 to the lower guide portion 7. A spring may be provided which biases the teeth of the locking member out of engagement with the teeth of the mounting bracket when the lever is in the unlocked position.

The lever may be connected directly to the pin and may be trapped between a protrusion provided on the end of the pin furthest from the upper shroud and the fixed mounting bracket. This protrusion may comprise a nut, which is threaded onto the pin. A washer may be provided between the nut and the lever.

The lever may be pivotally connected to the pin or may be fixed to the pin in such a way that rotation of the lever produces a rotation of the pin.

A cam portion may be connected to the lever in such a way that rotation of the lever about the axis of the pin causes rotation of the cam. The cam portion may define a first cam face which co-operates with a second cam face provided on the locking member. Thus, as the lever is rotated the cams cause the locking member to be displaced towards or away from the fixed bracket so that the whole assembly can be locked or unlocked. The lever and the cam may comprise a single component.

An end of the lever may be shaped to form a handle which can comfortably be gripped by the user.

The energy-absorbing device fixes the toothed rail member to the upper shroud in normal use but allows them to move relative to one another when they have been subjected to a high force such as may occur in an impact. The device may connect the lower guide portion to the upper shroud portion. The energy-absorbing member may be deformable in the event of an accident to permit the upper shroud to move relative to the guide portion. Alternatively or additionally it may be adapted to shear or otherwise snap, at least in part, upon an impact force applied to the steering column assembly. This connection prevents the user from adjusting the reach of the column in normal use yet still permits axial movement in the event of a crash.

In the alternative the energy-absorbing member only connects the toothed rail member to the upper shroud allowing the upper shroud to move freely relative to the guide portion in normal use. This allows the user to adjust both rake and reach when the lever is in the unlocked position.

The energy-absorbing device may include a member which deforms as the upper shroud is moved further into the guide portion in an accident. This may conveniently comprise a metal strip which is connected to the toothed rail portion and hooks over a portion of the upper shroud, for example a lower end of the upper shroud. As the shroud moves into the guide portion the strip is bent which absorbs energy.

The width and or the thickness of the strip may vary along its length to control the rate of absorption of energy during collapse of the assembly.

The energy absorbing member may comprise an inextensible member housed inside the guide portion and which is dragged around a pulley fitted to the pinch or clamp bolt.

Preferably the tethered end of the loop is hooked into a hole of a clamping panel, and the free end of the loop is formed into a second hook which during the initial stage of crash collapse, is dragged off a small anchor post.

In another construction the energy-absorbing member comprises a loop of wire which is dragged around a portion of the toothed rail member when the upper shroud is forced to telescope down in crash mode.

In such an assembly it is ideal to ensure that the same relationship exists between the collapse force (which is generated by forcing the wire around the hub) and the collapse distance, regardless of the initial position of "Reach" namely column length) adjustment at the time of the crash. To achieve this, the toothed rail may be provided with an elongated slot which complements the slot in the upper shroud, which allows it to move longitudinally relative to the clamp bolt during reach adjustment.

During a crash, the hub remains fixed relative to the column guide portion which is static in crash due to its teeth being engaged with the teeth of the toothed member carried by the pin.

One end of the wire loop is fixed to a post which is integral with the channel section which is welded to the upper column tube. Optionally, the other end of the loop is partially wrapped around a second post, also integral with the same channel so that it provides an additional collapse force during to first few millimetres of crash collapse. This is to resist the explosive reaction of the air bag deployment.

Optionally, to provide the column with the required longitudinal force resistance during normal driving, a small shear pin may be disposed between the toothed rail member and the channel. By this means, the necessity is avoided for having a lash-free fit between the wire end attachments to the channel and the hub.

A leaf type spring may act between the head of the clamp bolt and the toothed flange hub to ensure that the reach-clamping teeth are disengaged fully when the clamp mechanism is released.

A small rubber moulding may also be inserted at each end of the slot in the toothed member to provide "soft stops" which prevent a loud impact noise at the extremes of reach adjustment.

The steering shaft may comprise a telescopic shaft having at least an upper part and a lower part, the upper part co-operating with the lower part and the two parts extending through the guide portion and the upper shroud portion.

A lower axial bearing may be provided which is located in a seat in the guide portion and locates the lower steering column part. Similarly, an upper axial bearing may be provided which is supported in a seat in the upper shroud portion and provides axial location for the upper steering shaft part.

The lower part of the steering shaft may be slidingly engaged with a bore in the upper part of the steering shaft. One or more splines on the lower part (or upper part) may co-operate with one or more slots in the upper part (or lower part) to prevent relative rotation of the two parts.

The guide portion may be provided with at least one arcuate wall which co-operates with a complimentary arcuate guide wall of the upper shroud to define a contact surface along which the upper shroud portion is adapted to slide relative to the guide portion in the event of an accident. By providing a guide wall of the upper shroud portion which directly co-operates with a guide wall of the guide portion the process of alignment of the upper shroud relative to the guide portion is simplified.

In a most convenient arrangement the guide wall of the guide portion defines at least one surface of constant radius (defining a segment of a first cylinder) whilst the guide wall of the upper shroud also defines at least one surface of constant radius (defining a segment of a second cylinder) with both walls having substantially the same radius. The axis of revolution of the guide walls preferably coincides with the axial centre of the upper and lower bearing seats and is aligned with the axis of the steering shaft. Thus, as the two walls are brought into contact it is assured that the bearing seats and hence the steering shaft are correctly aligned.

The wall of the guide portion may directly contact the wall of the upper shroud portion. In an alternative, a shim may be fitted between the two portions which is trapped between the walls. This may comprise a steel sheet. It may be glued or otherwise fixed onto the arcuate wall of the guide portions.

The arcuate walls provide an arc of contact between the two portions, which keeps them axially aligned as the two parts move relative to one another. In the event of an accident, one wall is adapted to slide over the other with the walls constricting the movement of the two portions.

The provision of arcuate walls is especially convenient as they are relatively simple to manufacture with a high degree of accuracy. By providing an arcuate wall on the guide portion, which co-operates with a wall on the upper shroud it is relatively simple to ensure that the two parts are concentric. This ensures that the upper and lower bearings can also be made concentric which further ensures that the steering shaft is correctly aligned with the motor housing.

The guide portion may comprise a cast metal or plastic or composite component. It is preferably cast in aluminium. The arcuate wall may be formed after casting by drilling a bore through the casting.

Where the arcuate walls are formed by drilling a bore through the guide portion the same tool can conveniently be used to form the seat for the lower bearing. This ensures that the arcuate walls and the bearing seat will be concentric and that the lower part of the steering shaft-supported by this bearing-is also concentric with the arcuate wall.

Thus, the wall of the guide portion and the lower bearing seat may be machined using a single tool during manufacture. Obviously, the provision of arcuate walls of constant radius is especially convenient. Nevertheless, the walls need not have a constant radius in order for the alignment benefits of the present invention to be achieved.

The bearing seat for the lower bearing may have a larger diameter than the arcuate walls allowing the walls to be formed by drilling completely through the guide and subsequently forming the seat. This considerably reduces the cost of producing the guide member. In this case, the arcuate walls will extend along the full length of the guide member before the bearing seat is formed.

The bore may be open at one side such that the guide portion comprises an elongate member having a generally c-shaped cross section along its length. A slot may be provided, for example by casting, in the internal wall of the guide portion opposite the open side of the cross-section. In this case, the guide portion will define two arcuate internal surfaces of equal radius and having a common axis, one section provided on each side of the slot. Both internal surfaces together define the arcuate wall of the guide portion and locate the upper shroud portion.

One or more pinch bolts may be provided which connect one open side of the c-shaped guide to the other, tightening of the bolt or bolts clamping together the sides of the guide onto pinch bolt posts provided around the bolts. This helps to strengthen the structure of the guide portion.

The upper shroud may comprise a cylindrical member or tube with the external radius of the tube being the same as (or slightly less than) the radius of the arcuate wall of the guide portion. The external wall of the tubular member may therefore define the arcuate wall of the upper shroud portion, which fits into the guide portion. It is most preferred that the upper shroud portion is a snug sliding fit within the bore in the guide portion. It may be desirable to machine the outer surface of the tube if low-grade tubing is used. The internal wall of the tube will provide the required seating for the upper bearing housing.

The upper bearing may be seated within the bore of the tubular upper shroud portion. This may be located as near as practically possible to the open, upper, end of the upper shroud portion. This ensures that the upper and lower bearings are as far apart as possible.

A further, intermediate bearing may be provided near to the lower end of the upper shroud portion.

A steering lock mechanism may be provided which in an unlocked position permits the upper part of the steering shaft to rotate relative to the upper shroud and in a locked position prevents relative rotation between the upper shroud and the upper part of the steering shaft.

Where a lock is provided the alignment means may be adapted to prevent rotation of the upper shroud portion relative to the guide portion. This resists any torque applied to the upper shroud by a thief levering against the steering wheel. As such, it should be able to resist a torque of at least 200 Nm or more.

The alignment means may therefore comprise a guide rail provided on the upper shroud portion which fits in a corresponding guide slot formed into the inside wall of the c-shaped guide opposite the open side of the guide portion. The clamping bolt may clamp the rail into the slot.

The assembly preferably comprises a part of an electric power assisted steering assembly. As such, the guide portion may include one or more mounting portions for securing the guide portion to a housing of an electric motor. The guide portion may be rigidly secured to the motor housing. It may, for example, be bolted or welded or otherwise secured to the motor housing.

An output shaft of the motor may co-operate with a lower end of the lower steering shaft part, which extends from the guide portion into the motor housing. The housing may also accommodate a torque sensor which measures the torque carried by the steering shaft and produces an output signal indicative of torque which is used to at least partially determine the amount of torque applied to the shaft by the motor.

It is possible to rigidly bolt the guide portion to the motor housing because the accuracy of the alignment of the upper and lower bearings, the guide walls and the mating surface is relatively high.

Because the guide is rigidly secured to the motor housing a simple bracket may be provided which supports the guide portion to the vehicle and permits adjustment of the rake of the assembly. The bracket may be a pressed steel component.

Other advantages of this invention will become apparent to those skilled in the art from the following detailed description of the preferred embodiment, when read in light of the accompanying drawings.

DETAILED DESCRIPTION OF THE INVENTION

The assembly comprises a two-part steering shaft 1,2 which interconnects a steering wheel (not shown) with an electric motor 4. The motor outputs a torque through an output shaft 3 to a lower end of a first, lower, part 1 of the steering shaft. The second, upper part 2, of the steering shaft is secured at its upper end to the steering wheel. The second part 2 of the steering shaft has a splined internal bore 5, which slidingly accommodates an upper end of the lower part 1 of the steering shaft. Splines on the two parts prevent the from rotating relative to one another.

The motor is located within a cast metal housing. An elongate guide portion 7 is secured by bolts (not shown) to the housing at the mating face. The guide portion is cast from aluminium and has an annular mating face 6 on one end which mates with a complementary annular seat on the housing. The guide portion defines a lower shroud for the steering shaft, which extends through the centre of the guide portion 7 for rotation there within. The guide portion 7 extends away from the motor housing past the point where the two parts of the steering shaft interengage but stops short of the upper end of the steering shaft. The remainder of the steering shaft is covered by a hollow tubular upper shroud 8, which is slidingly engaged within the guide portion 7 around the steering shaft 1,2.

The elongate guide portion 7 has a generally c-shaped cross section along most of its length with the inside wall 9 of the guide portion 7 being at least partially defined by a continuous annular through bore. The bore defines two arcuate wall sections, which co-operate with corresponding arcuate wall sections of the outer wall of the upper steering column shroud. The arcuate sections where the guide portion 7 engages the upper shroud 8 provide location and guidance for the upper shroud.

The guide portion 7 defines a seat for a lower annular bearing 10 which supports the lower part 1 of the steering shaft at a point where it enters the motor housing 6. The upper shroud 8 also supports an upper annular bearing 11 located inside its bore, which supports the upper part 2 of the steering shaft. The upper bearing 11 and the lower bearing 10 therefore provide a complete location for the steering shaft. The inner diameter of the through bore in the guide portion is of smaller diameter than the diameter of the lower bearing seat.

Figure 1:
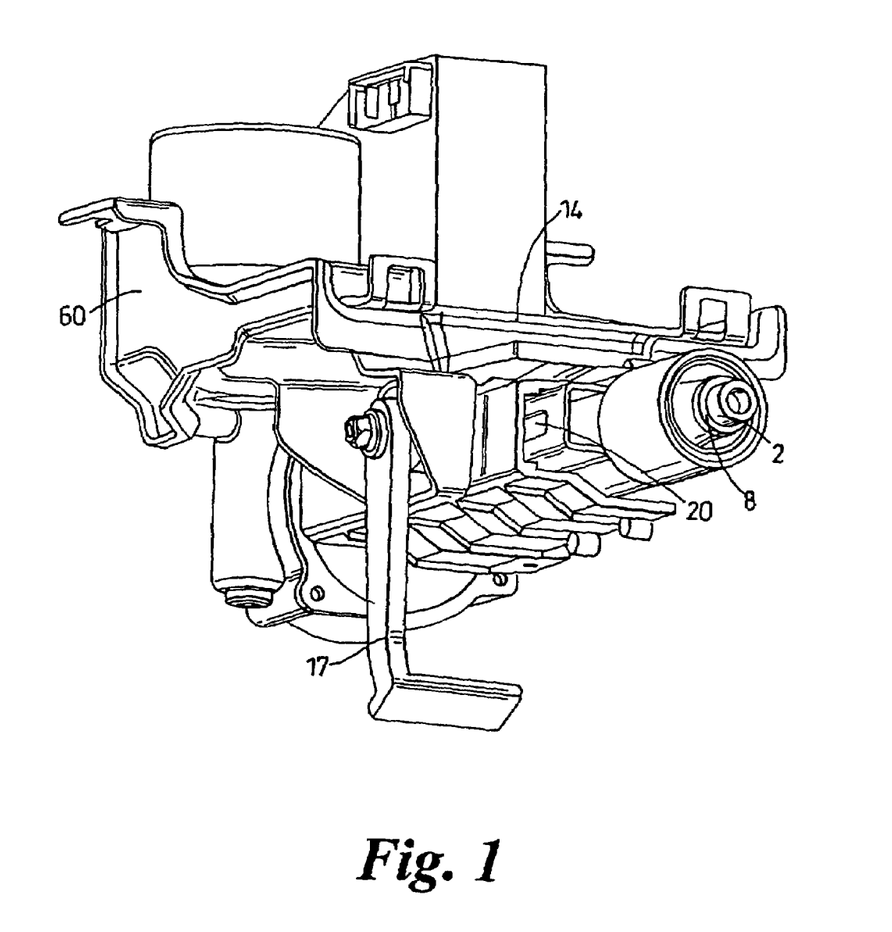
FIG. 1 is a perspective view of an embodiment of the invention.
Figure 2:
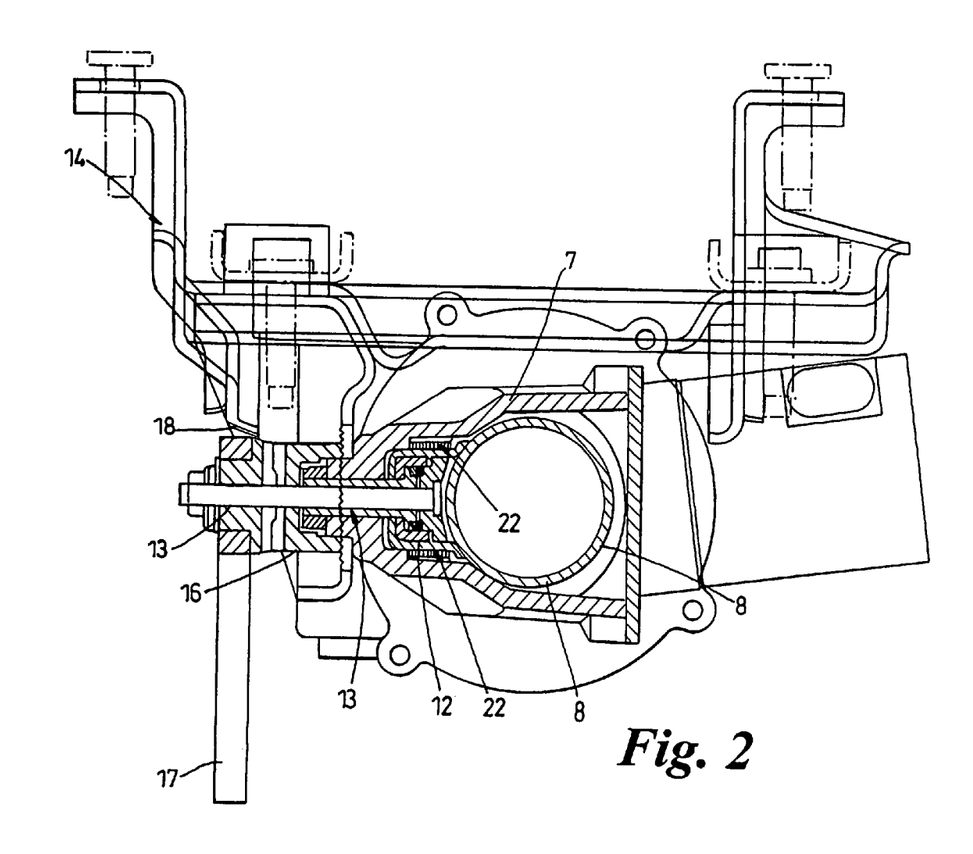
FIG. 2 is a transverse section through the assembly of FIG. 1.
Figure 3:
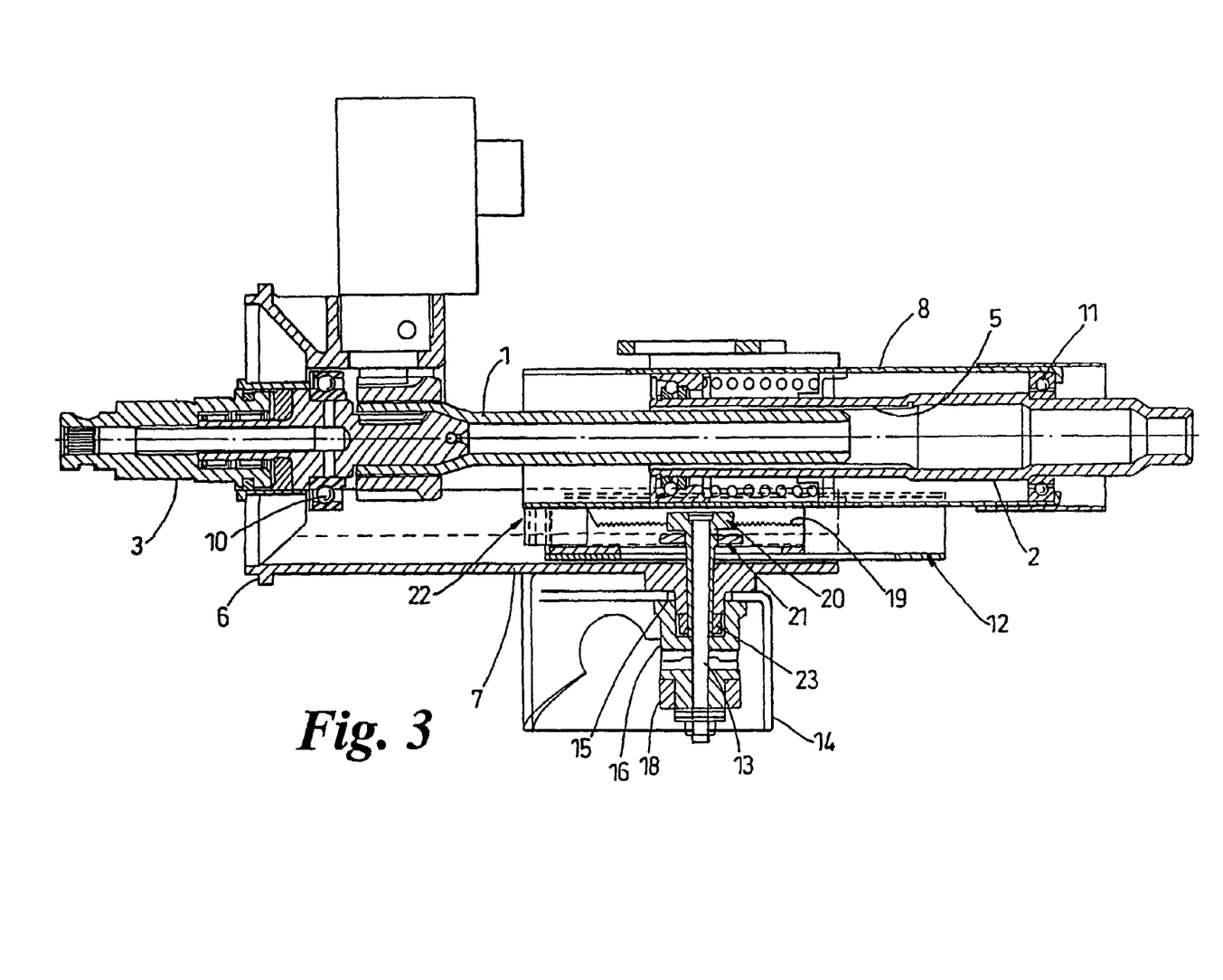
FIG. 3 is a longitudinal section through the assembly of FIG. 1.
Figure 4:
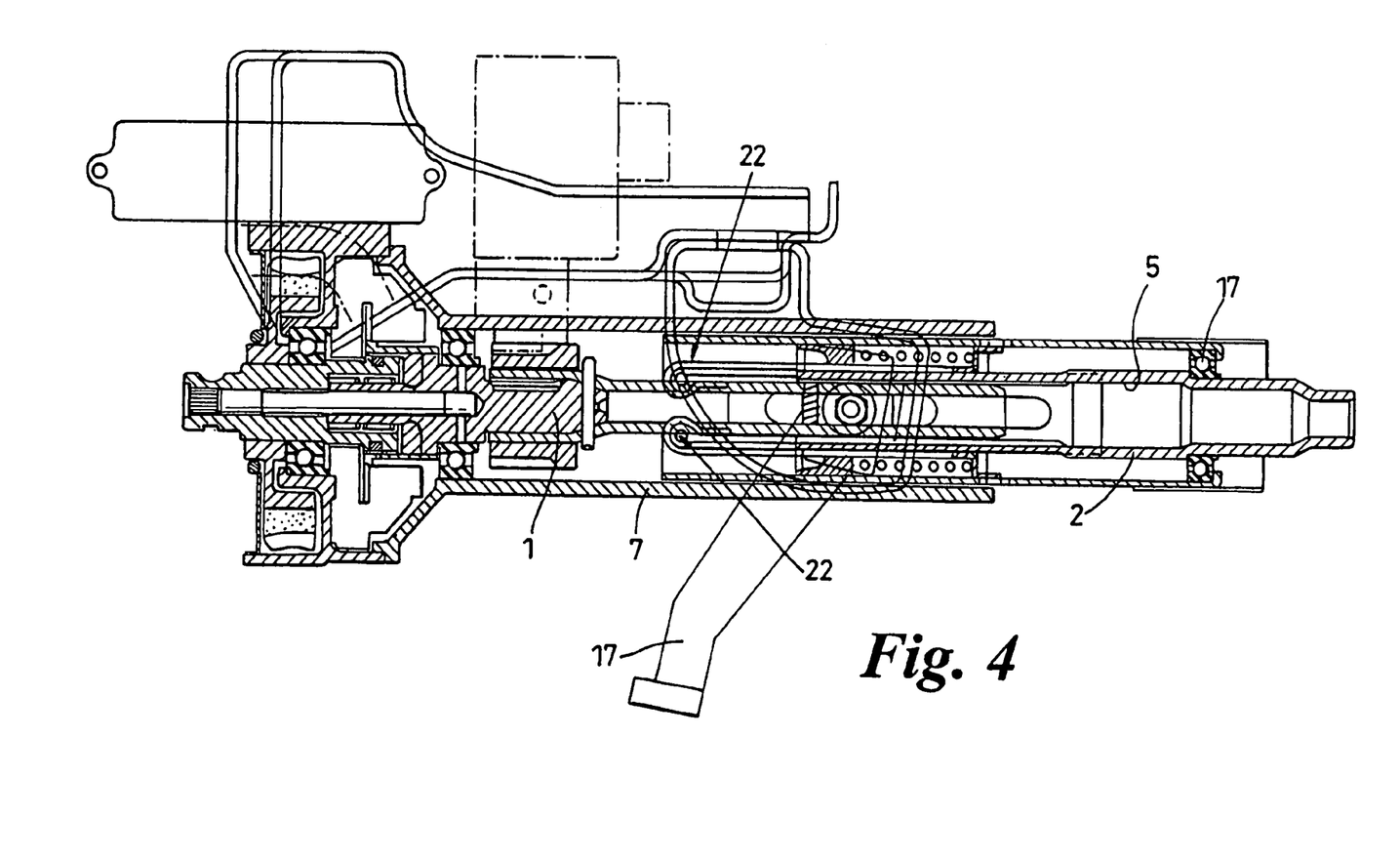
FIG. 4 is a longitudinal section similar to FIG. 3 but spaced from it by 90°.

As shown in FIG. 2, a groove is cast in the inside wall of the guide portion 7. This groove extends axially along the guide portion 7 opposite the open side of the c-shaped cross section, and separates the two arcuate guide surfaces. A locating rail 12 is laser welded to one side of the upper shroud 8 and is located within the groove in the guide portion 7. The location of this rail 12 in the groove ensures that the upper shroud 10 will resist any torsional forces, which may be applied to the upper shroud. These forces typically occur if a thief tries to break a steering column lock provided between the shroud 10 and the steering shaft by levering on the steering wheel.

In normal use the guide portion 7 holds the upper shroud 8 in a fixed axial position. The upper bearing 11 and the lower bearing 16 provide axial locations for the two part steering shaft 1,2, and the housing 6 supports the motor relative to the steering shaft. The upper shroud 8 is fixed in place axially by frictional engagement between the arcuate guide and the shroud.

Because the upper shroud 8 is held in place by frictional contact between its outer wall and the arcuate sections of the inside of the guide portion 7, all the parts are aligned concentrically with a high degree of accuracy. This is further assured by machining the inner through bore of the guide portion 7 and the seat for the lower bearing 10 using a single tool to ensure concentricity. The outer wall of the upper shroud 8 may also be machined if desired in a separate operation.

In the event of an accident, which causes a driver to apply a high axial load to the steering wheel, the upper shroud 8 can move axially into the guide portion 7 by sliding along the arcuate guide faces. At the same time, the steering shaft 1,2 can collapse axially with the lower part 1 of the steering shaft sliding into the upper part 2.

To permit the rake of the steering column assembly to be adjusted the guide portion 7 is secured by a lateral connecting pin or clamp bolt 13 to a pressed steel bracket 14 secured to the vehicle body. The bracket has a vertical elongate slot 15 and the clamp bolt passes through this slot and a bushed opening or slot in the guide portion 7. The guide portion 7 can be moved when the bolt is loosened, allowing the position of the assembly to be adjusted. When the bolt is tightened the assembly is fixed. One end of the bolt 13 is connected to a cam 16 which is of larger diameter than the slot in the bracket. The other is connected to a handle 17 which operates a moving cam 18.

The pin also passes through an elongate slot in the rail 12 welded to the upper shroud 8 which is aligned with the axis of the steering column. When unlocked the pin can move along this elongate slot permitting axial adjustment of the steering column. This relative axial movement between the upper shroud 8 and the guide portion 7 is controlled by providing an energy absorbing element 18 which is deformed in a controlled manner as the assembly collapses. This deformation absorbs energy to provide an optimal rate of collapse and control of the energy applied through the steering wheel.

The guide portion 7 accommodates an additional toothed rail member 19 which is a slidable close fit inside it. This additional toothed member 19 has a central slot through which the pin 13 passes and is provided with serrations on the edges of its two flanges. These serrations engage with complementary serrations on the underside of a sintered toothed member 20 which is pulled into engagement by the inner end of the clamp pin 13. An additional "Reach" release spring 21 ensures that these serrations 82, 84 fully engage when the clamp is released.

The length of the serrated portion of the tooth rail 19 is such that the toothed member 20 can engage with it in any position of "Reach" adjustment. A slot in the vertical wall of the tooth rail 19 allows for its movement in "Reach" adjustment relative to the clamped spindle 13.

An energy absorbing device comprising two energy straps is provided which locate the toothed rail member relative to the upper shroud in normal use and control relative movement between the pin and the shroud during a crash. The tethered ends of the two energy straps 22 are welded to the inside faces of widened flanges at the lower end of the toothed rail member 19, namely the end which is furthest from the steering wheel.

The lower ends of the two flanges 83 of toothed rail member are curled inwards to form anvils over which the energy straps 22 are dragged during crash collapse. Before fining the welded assembly of toothed rail member 19 plus energy straps 80 to the guide portion 7, the energy straps 22 are substantially straight. Once assembled to the guide portion 7, the end of each energy strap 22 is bent through 180° and formed tightly over its respective anvil by a special tool which effectively locks the welded assembly rigidly to the clamping channel 7.

It follows therefore that during normal "Reach" adjustment the toothed rail member 19 and the guide portion 7 move together during crash collapse, the toothed channel 19 is unable to move because it is locked to the connecting pin 13 by the toothed block 20. Hence, during crash collapse, the energy straps 22 are dragged around the anvils of the guide portion 7, which of course moves with the upper column tube, in order to accommodate the relative movement between the channel and the toothed rail. The collapse force characteristic is a function of the initial relative positions of the energy straps 22 and the guide portion and this remains the same for all "Reach" adjustment positions.

In a modification (not shown) small vertical hooks are formed in the free ends, namely the ends nearest the steering wheel, of the energy straps 22 which, during the above-mentioned "curling" operation in manufacture, come into engagement with corresponding transfer slots cut in the flanges of the guide portion 7. The action of pulling these hooks out of the slots will provide an additional crash force at the start of the collapse in order to resist the reaction of the airbag deployment.

A free-play adjuster nut 23 engages with a hollow free-play adjuster bolt 24 which is co-axial with the connecting pin 13. A rectangular adjuster bolt anti-rotation plate is welded to the head of the bolt 24 to prevent it from rotating. The nut is treated with "Patchlok" so that its setting cannot change in service. This method of pre-loaded adjustment gives the superior control of sliding the friction between the upper column tube and the guide post. This is required to arrive at and maintain acceptable "Reach" adjustment forces, which must be controlled within narrow limits defined by the specifications of the customers.

As an optional feature steel running strips cover the machined arcs of the guide portion 7. These are clipped into cast slots and provide a smoother and lower wearing sliding action between the upper column tube and the guide post than would be the case with the steel tube bearing directly onto the aluminium guide post. The running strips are made from accurately thin and flexible shim steel so that the addition of them has only a small effect on the accuracy of alignment between the upper column tube and the guide post. These changes may be needed for the double-adjustment column because the sliding action can take place many thousands of times and must be quiet and must change significantly in feel over the life of the vehicle.

The upper column tube is completely circular. This allows it to pass the electric key-lock in crash.

In a modification the upper column tube may be provided with a longitudinal slot in its lower end which avoids a collision with the pawl of the electric key-lock in the unlikely event of the lock being engaged during the crash.

In another construction an external method is provided for controlling the amount of lateral free play between the upper column tube and guide portion while the clamp is released for column rake and reach adjustment. This may take the form of a plastic "slipper" moulding which is mounted from the guiding portion stiffener plate and which bears the onto right hand side of the upper column tube and is finely adjustable for running clearance from the tube via two or more stiff threaded screws.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An adjustable steering column assembly for a vehicle comprising:
    an upper shroud portion which is adapted to receive a steering column;
    a lower guide portion which is adapted to support said shroud portion and be secured to a mounting bracket fixed relative to a chassis of said vehicle;
    a connecting pin which projects through an elongate opening provided in said fixed bracket, an opening in said lower guide portion and an elongate opening in said upper shroud portion;
    a toothed rail member which is connected to said upper shroud portion by an energy absorbing device; and
    an operating lever which is operatively connected to said connecting pin;
    in which said pin carries a toothed member provided on an end of said connecting pin nearest said steering column which engages with said toothed rail when said pin is drawn towards said fixed bracket by operation of said operating lever to a locked position to clamp said toothed rail, said upper shroud and said guide portion onto the fixed mounting bracket.

2. An adjustable steering column assembly according to claim 1 wherein said upper shroud includes a channel section which accommodates said toothed rail member and said end of said connecting pin.

3. An adjustable steering column assembly according to claim 1 wherein said toothed rail comprises two rows of teeth, one row extending along each side of the elongate opening in said upper shroud portion.

4. An adjustable steering column assembly according to claim 1 wherein a spring is provided which biases said toothed member carried by said pin out of engagement with said toothed rail when said lever is moved to an unlocked position.

5. An adjustable steering column assembly according to claim 4 wherein said upper shroud includes a channel section, and said spring is provided between said toothed member and an inner face of said channel section.

6. An adjustable steering column assembly according to claim 1 wherein said toothed member carried by said pin comprises a head portion of said pin.

7. An adjustable steering column assembly according to claim 1 wherein said opening in said fixed mounting bracket comprises a substantially vertically inclined elongate slot.

8. An adjustable steering column assembly according to claim 1 wherein at least one track of teeth is provided alongside said opening which co-operate with teeth on a locking member operatively connected to said connecting pin when said lever is in a locked position.

9. An adjustable steering column according to claim 8 wherein said locking member is provided on an opposite side of said mounting bracket to said lower guide portion, and in which a spring is provided which biases said teeth of said locking member out of engagement with said teeth of said mounting bracket when said lever is in an unlocked position.

10. An adjustable steering column assembly according to claim 1 wherein said lever is connected directly to said pin and is trapped between a protrusion provided on an end of said pin furthest from said upper shroud and said fixed mounting bracket.

11. An adjustable steering column assembly according to claim 10 wherein said protrusion comprises a nut which is threaded onto said pin.

12. An adjustable steering column assembly according to claim 1 wherein said lever is pivotally connected to said pin.

13. An adjustable steering column assembly according to claim 1 wherein said toothed rail member includes an elongate slot through which said connecting pin passes and in which a resilient insert, for example of rubber, is inserted at each end of said slot in said toothed member to provide "soft stops" which prevent a loud impact noise at the extremes of reach adjustment.

14. An adjustable steering column assembly according to claim 1 wherein said steering shaft comprises a telescopic shaft having at least an upper part and a lower part, the upper part co-operating with said lower part and said two parts extending through said guide portion and said upper shroud portion.

* * * * *